(12) United States Patent
Nozaki et al.

(10) Patent No.: US 8,408,354 B2
(45) Date of Patent: Apr. 2, 2013

(54) ALL TERRAIN VEHICLE

(75) Inventors: Takuma Nozaki, Kobe (JP); Kazumasa Hisada, Akashi (JP); Itsuo Takegami, Kobe (JP); Shusuke Minami, Lincoln, NE (US)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 203 days.

(21) Appl. No.: 12/980,256

(22) Filed: Dec. 28, 2010

(65) Prior Publication Data
US 2012/0160593 A1 Jun. 28, 2012

(51) Int. Cl.
*B62D 5/04* (2006.01)
(52) U.S. Cl. ........................ 180/444; 280/779
(58) Field of Classification Search .......... 180/443, 180/444; 280/779; 74/495, 492
See application file for complete search history.

(56) References Cited

U.S. PATENT DOCUMENTS

| 7,644,939 | B2* | 1/2010 | Tomita | 280/89 |
|---|---|---|---|---|
| 7,775,318 | B2* | 8/2010 | Okada et al. | 180/444 |
| 7,922,204 | B2* | 4/2011 | Yoshii et al. | 280/779 |
| 7,992,671 | B2* | 8/2011 | Okada et al. | 180/444 |
| 8,122,993 | B2* | 2/2012 | Ripley et al. | 180/233 |
| 2006/0175124 | A1* | 8/2006 | Saito et al. | 180/444 |
| 2006/0196722 | A1* | 9/2006 | Makabe et al. | 180/443 |
| 2009/0308682 | A1 | 12/2009 | Ripley et al. | |

* cited by examiner

*Primary Examiner* — Anne Marie M Boehler
(74) *Attorney, Agent, or Firm* — Alleman Hall McCoy Russell & Tuttle LLP

(57) ABSTRACT

An all terrain vehicle includes a steering shaft coupled to a handle; a power steering device including an input shaft coupled to the steering shaft, and an output shaft driven to rotate together with the input shaft, the power steering device being positioned between right and left front wheels in a rightward and leftward direction; a link unit for coupling the output shaft to each of the right and left front wheels, the link unit receiving a rotation of the output shaft and changing a direction of the front wheels; and a stopper disposed to face the output shaft with a clearance between the stopper and at least a left portion and a right portion of an end portion of the output shaft.

8 Claims, 9 Drawing Sheets ns of the 1. The pair of lower main frames 12 extend in the

ALL TERRAIN VEHICLE

BACKGROUND OF THE INVENTION

1. Field of the Invention

The present invention relates to an all terrain vehicle including right and left front wheels. Particularly, the present invention relates to an all terrain vehicle including a power steering device for assisting a driver's operation for changing a direction of the front wheels.

2. Description of the Related Art

U.S. Patent Application Publication No. 2009/0308682 discloses an all terrain vehicle including an electric power steering device for lessening a force required for a driver's steering operation. The electric power steering device includes an input shaft coupled coaxially with a steering shaft provided with a handle, an output shaft coupled to front wheels via tie rods, an electric motor for generating a steering force, etc. When the handle is steered and the input shaft rotates, the electric motor is actuated according to this rotation and the output shaft, supported on a bearing, rotates. The rotation of the output shaft is transferred to the front wheels via the tie rods, and the front wheels change their direction.

SUMMARY OF THE INVENTION

An all terrain vehicle of the present invention comprises a steering shaft coupled to a handle; a power steering device including an input shaft coupled to the steering shaft, and an output shaft driven to rotate together with the input shaft, the power steering device being positioned between right and left front wheels in a rightward and leftward direction; a link unit for coupling the output shaft to each of the right and left front wheels, the link unit receiving a rotation of the output shaft and changing a direction of the front wheels; and a stopper disposed to face the output shaft with a clearance between the stopper and at least a left portion and a right portion of an end portion of the output shaft.

In accordance with such a configuration, the stopper is disposed to face the output shaft with a clearance between them. For this reason, in a case where a relatively small external force is applied to the front wheels, a rotation of the output shaft is not impeded by the stopper. Therefore, when the power steering device is driven, the front wheels can change their direction according to an operation of the link unit. On the other hand, in a case where an impact acts on the front wheels due to bumps or depressions on a road surface, etc., and a load due to the impact is input to the output shaft via the link unit, the output shaft might be tilted to the left or to the right because of the load, but an outer surface of the output shaft can come into contact with the stopper. This allows the stopper to support a part of the load input to the output shaft, thereby making it possible to reduce the load applied to the power steering device. Therefore, durability of the power steering device can be improved. Such an advantage is achieved with a simple structure in which the stopper is provided.

The above and further object and features of the invention will more fully be apparent from the following detailed description with accompanying drawings.

DETAILED DESCRIPTION OF THE PREFERRED EMBODIMENTS

Hereinafter, an embodiment of the present invention will be described with reference to the drawings. The stated directions are referenced from the perspective of a driver riding in an all terrain vehicle.

Figure 1:
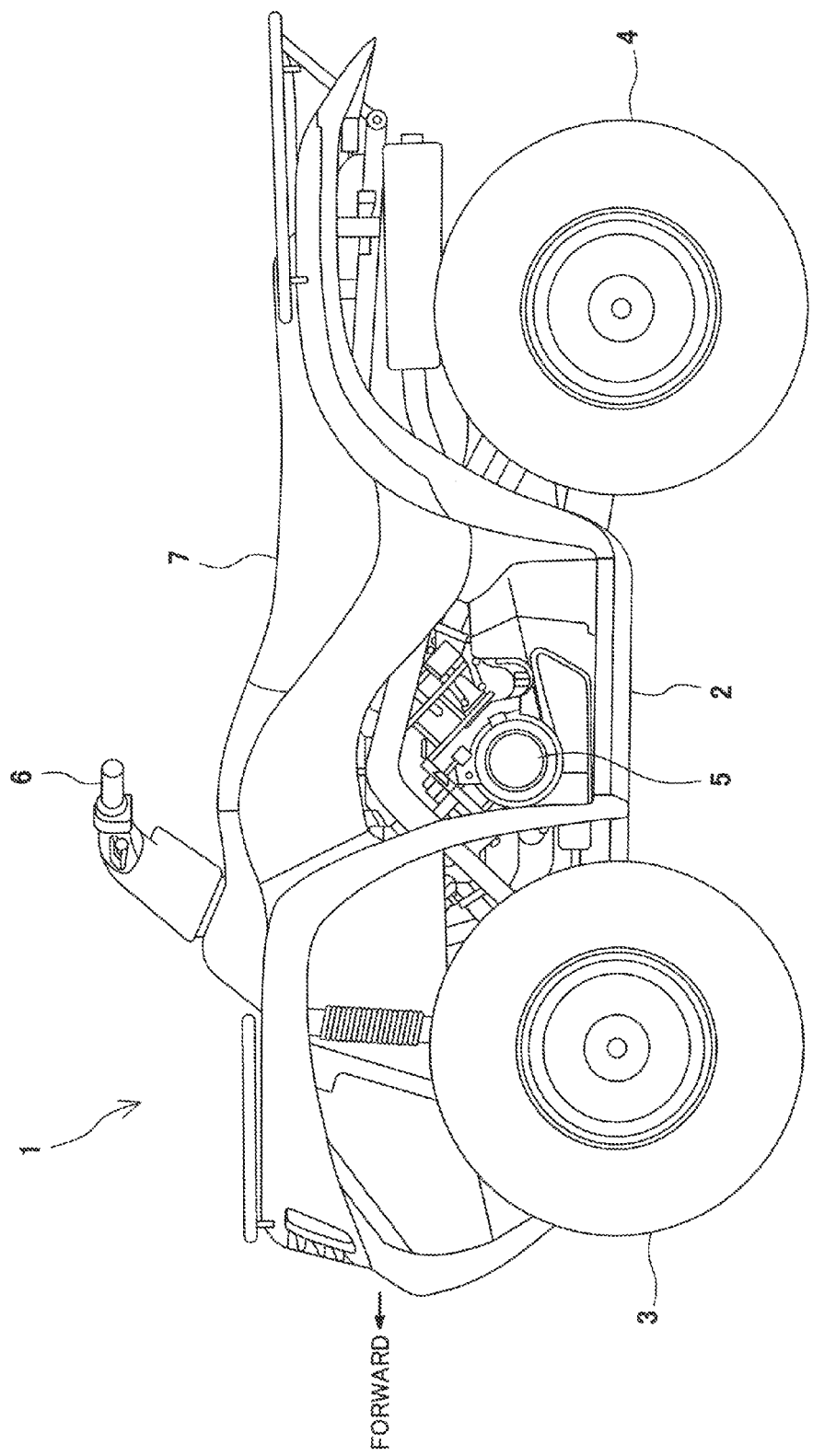
FIG. 1 is a side view showing an all terrain vehicle according to an embodiment of the present invention, when viewed from a left side.

FIG. 1 is a side view showing an all terrain vehicle 1 according to an embodiment of the present invention, when viewed from a left side. As shown in FIG. 1, the all terrain vehicle 1 is a straddle-type four-wheel vehicle including a vehicle body frame 2, right and left front wheels 3 and right and left rear wheels 4 (in FIG. 1, only left front wheel and left rear wheel are shown). The vehicle body frame 2 is constructed in such a manner that a plurality of metal-made pipes are welded to each other. The front wheels 3 are suspended from a front portion of the vehicle body frame 2. The rear wheels 4 are suspended from a rear portion of the vehicle body frame 2. An engine 5 is mounted to the vehicle body frame 2 between the front wheels 3 and the rear wheels 4 in a forward and rearward direction. A handle 6 is disposed obliquely behind and above the front wheels 3, and a seat 7 is provided behind the handle 6. The handle 6 has a bar-shape to enable a driver straddling the seat 7 to steer the handle 6.

Figure 2:
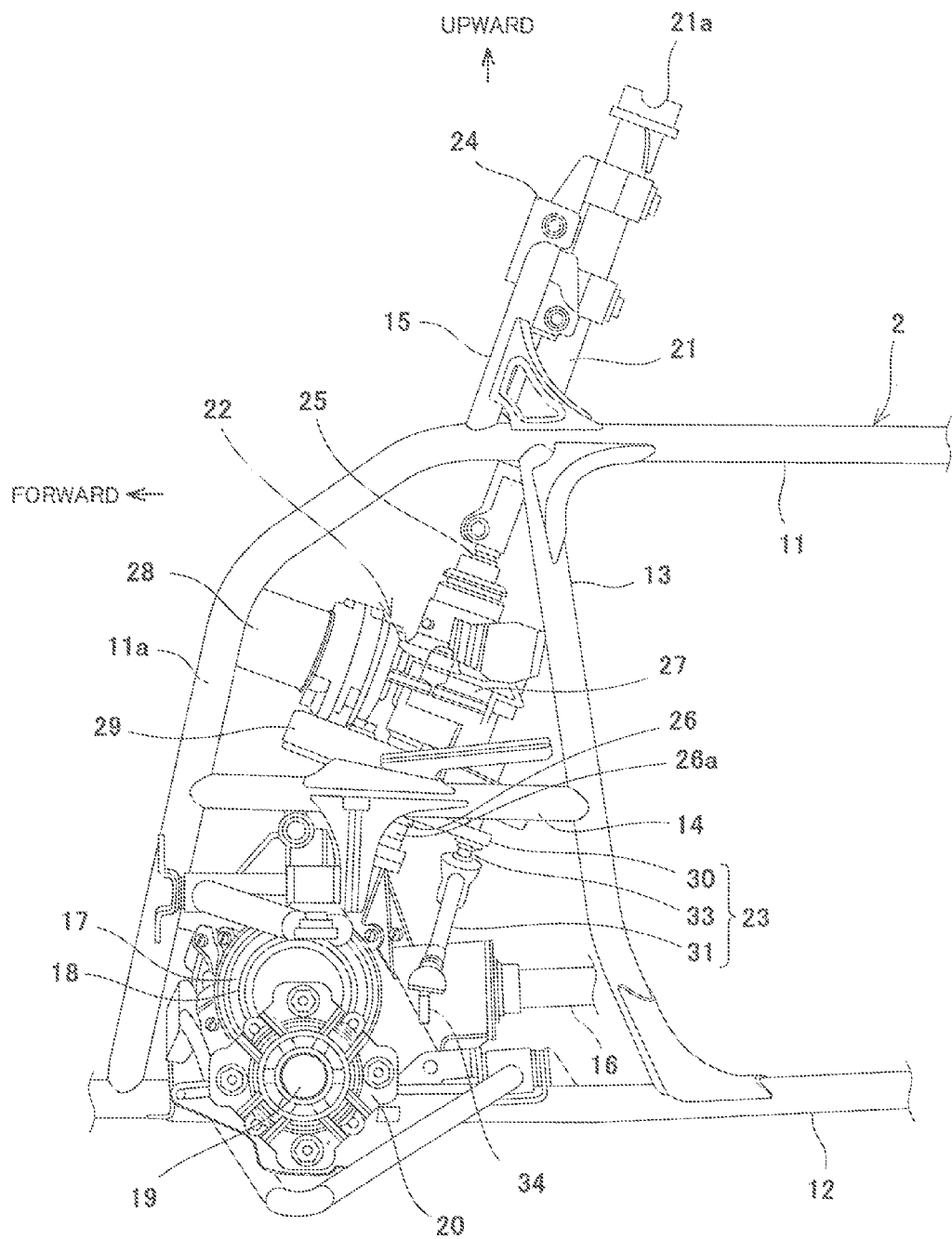
FIG. 2 is a side view of a front portion of a vehicle body frame when viewed from a left side.

FIG. 2 is a side view of a front portion of the vehicle body frame 2 of FIG. 1 when viewed from a left side. As shown in FIG. 2, the vehicle body frame 2 includes a pair of right and left upper main frames 11, a pair of right and left lower main frames 12, a pair of right and left gusset frames 13, a pair of right and left sub-gusset frames 14, and a steering support frame 15. The pair of upper main frames 11 extend in the forward and rearward direction at a front side of the all terrain vehicle 1 (FIG. 1). The pair of lower main frames 12 extend in the forward and rearward direction below the upper main frames 11. Each upper main frame 11 includes at its front portion a tilted portion 11a tilted downward in a forward direction, and a lower end portion of the tilted portion 11a is coupled to the lower main frame 12. Each gusset frame 13 extends vertically behind the tilted portion 11a and couples the upper main frame 11 to the lower main frame 12. Each sub-gusset frame 14 extends forward from a vertical center portion of the gusset frame 13, and couples this vertical center portion to the tilted portion 11a. A steering support frame 15 couples upper end portions of tilted portions 11a of the upper main frames 11.

A driving power generated in the engine 5 (see FIG. 1) is transmitted to the right and left front wheels 2 (see FIG. 1) via a propeller shaft 16 and a transaxle device 17. The transaxle device 17 is disposed between the right and left front wheels 3 in a rightward and leftward direction and between the sub-gusset frame 14 and the lower main frame 12 in a vertical direction. The transaxle device 17 includes a gear case 18, a pair of axles 19 and a pair of brake units 20. The gear case 18 accommodates a reduction gear and a differential gear which are not shown. The pair of axles 19 protrude from the gear case 18 to the left and to the right, respectively. The brake units 20 are attached at tip ends of the axles 19, respectively.

The all terrain vehicle 1 (see FIG. 1) includes at its front portion, a steering shaft 21, an electric power steering (EPS) device 22 and a link unit 23 which are arranged in this order between the handle 6 (see FIG. 1) and the right and left front wheels 2 (see FIG. 1).

The steering shaft 21 extends substantially vertically such that it passes through a space between the pair of upper main fames 11 and is slightly tilted in a rearward direction. The steering shaft 21 includes at its upper end portion, a handle fastening portion 21a for fastening the handle 6 (see FIG. 1). The steering shaft 21 is rotatably supported by a support member 24 mounted to a steering support frame 15.

The EPS device 22 includes an input shaft 25, an output shaft 26, a gear case 27, an electric motor 28 and a sensor (not shown). The gear case 27 is supported on an upper surface of a support board 29 coupling the pair of sub-gusset frames 14 in the rightward and leftward direction. The input shaft 25 extends upward from the gear case 27 and is disposed coaxially with the steering shaft 21. A lower end portion of the steering shaft 21 is coupled to an upper end portion of the input shaft 25. The electric motor 28 is attached to the gear case 27 and is oriented in a forward direction which is substantially perpendicular to the input shaft 25. The output shaft 26 is disposed to extend substantially in parallel with the steering shaft 21 and the input shaft 25. The output shaft 26 extends downward from the gear case 27 and a lower end portion 26a of the output shaft 26 is positioned below the support board 29.

Figure 3:
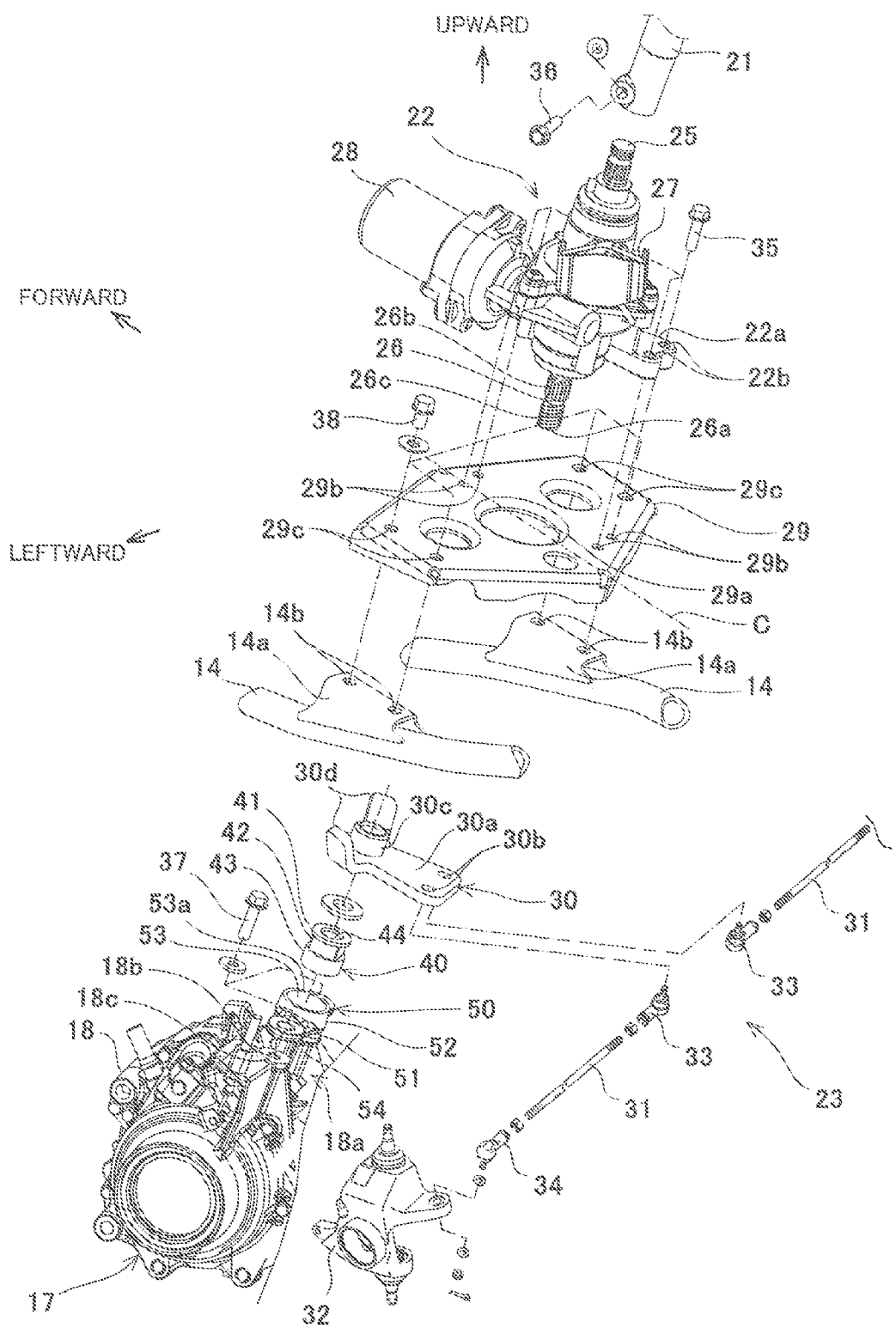
FIG. 3 is an exploded perspective view of an area surrounding an electric power steering device when viewed from leftward and behind.

The link unit 23 includes a pitman arm 30, a pair of tie rods 31 and a pair of front wheel support members 32 (see FIG. 3). The pitman arm 30 is fastened to the lower end portion 26a of the output shaft 26. The pitman arm 30 receives a rotation of the output shaft 26 and thereby is pivoted. The front wheel support members 32 are mounted to the right and left front wheels 2 (see FIG. 1), respectively. Each tie rod 31 is coupled at one end portion to the pitman arm 30 via a ball joint 33, and at an opposite end portion thereof to the front wheel support member 32 via a ball joint 34. The link unit 23 is disposed below the support board 29 and the sub-gusset frames 14, and couples the lower end portion 26a of the output shaft 26 to the right and left front wheels 2 (see FIG. 1). The link unit 23 receives the rotation of the output shaft 26 and changes a direction of the right and left front wheels 2.

When the driver rotates the handle 6 (see FIG. 1), the steering shaft 21 rotates and the input shaft 25 rotates. The sensor detects a rotational force input to the input shaft 25 and a rotational direction of the input shaft 25. The electric motor 28 is driven according to a result of detection of the sensor. By a driving force generated in the electric motor 28, an auxiliary rotational force is applied to the steering shaft 21 and to the input shaft 25. A rotational force of the input shaft 25 is transmitted to the output shaft 26 inside the gear case 27. When the output shaft 26 rotates, the pitman arm 30 is pivoted and the tie rods 31 operate, causing the front and left front wheels 2 (see FIG. 1) to change their direction.

FIG. 3 is an exploded perspective view of an area surrounding the EPS device 22 of FIG. 2, when viewed from leftward and behind. For example, a method of assembling components and units depicted in an exploded manner in FIG. 3 includes a step of assembling an assembly unit composed mainly of the steering shaft 21, the EPS device 22, the support board 29 and the pitman arm 30, a step of mounting the differential device 17 to the vehicle body frame 2 (see FIG. 2) and mounting the stopper 50 to the differential device 17 before or after mounting the differential device 17 to the vehicle body frame 2, a step of mounting the assembly unit to the vehicle body frame 2, and a step of assembling the link unit 23. In this embodiment, to fasten the pitman 30 in the step of assembling the assembly unit, the protrusive member 40 is attached to the lower end portion 26a of the output shaft 26. In a step of mounting the assembly unit to the vehicle body frame 2, the stopper 50 is positioned to face the protrusive member 40 attached to the lower end portion 26a of the output shaft 26 with a clearance between the stopper 50 and the protrusive member 40. Hereinafter, according to the exemplarily described order of the steps, a structure of an area surrounding the EPS device 22 will be described in detail.

To allow the EPS device 22 to be mounted to the support board 29, the support board 29 has a hexagonal shape having apexes at a front end and a rear end of a center portion in the rightward and leftward direction when viewed from above. A dimension in the forward and rearward direction of a center portion of the support board 29 in the rightward and leftward direction is set larger than a dimension of right and left end portions. The support board 29 has a circular through-hole 29a penetrating vertically the center portion in the rightward and leftward direction and female threads 29b disposed in two locations which are located in a front side and a rear side of the through-hole 29a. The EPS device 22 includes a pair of fastening portions 22a protruding forward and rearward from the gear case 27, respectively. Each fastening portion 22a has female threads 22b penetrating substantially vertically therethrough. In FIG. 3, the front fastening portion 22a is hidden by an electric case 27 provided to protrude from the gear case 27 in the direction in which the gear case 27 extends. The output shaft 26 is disposed between the pair of fastening portions 22a in the forward and rearward direction and extends downward to a location below lower surfaces of the fastening portions 22a. When the EPS device 22 is mounted to the support board 29, the output shaft 26 is inserted through the through-hole 29a and is disposed below the support board 29. Then, the lower surfaces of the fastening portions 22a are placed on an upper surface of the support board 29, the female threads 22b are aligned with the female threads 29b, respectively, and bolts 35 are inserted into the female threads 22b and 29b from above. An upper end portion of the input shaft 25 is fitted to an interior of a lower end portion of the steering shaft 21 and then is fastened to the steering shaft 21 by a bolt 36.

To allow the pitman 30 and the protrusive member 40 to be attached to the lower end portion 26a of the output shaft 26, the lower end portion 26a of the output shaft 26 has a spline portion 26b having a spline and a male thread 26c having a threaded portion are provided, in this order from above. Alternatively, both of the spline and the threaded portion may be formed on an outer peripheral surface of the output shaft 26.

The pitman arm 30 includes an arm base 30a, a pair of mounting portions 30b, a tubular connecting portion 30c, and a pair of limiters 30d. The arm base 30a has a flat plate shape which is elongated slightly in the forward and rearward direction. The pair of mounting portions 30b are provided at a right side and a left side in a rear end portion of the arm base 30a and are coupled to the tie rods 31 via ball joints 33, respectively. The tubular connecting portion 30c protrudes upward from a front portion of the arm base 30a. The tubular connecting portion 30c has openings at both vertical ends and is provided with a spline groove on its inner peripheral surface. The pair of limiters 30d protrude upward from right and left sides of a front portion of the arm base 30a.

The protrusive member 40 includes a flange portion 41, a tightening portion 42, an opposed portion 43 and female thread 44. The flange portion 41 is formed at an upper end portion of the protrusive member 40 and has a ring-shaped upper surface surrounding an opening of the female thread 44. The tightening portion 42 is provided at a lower side of the flange portion 41. An inner peripheral surface of the tightening portion 41 defines a female thread 44, while an outer peripheral surface of the tightening portion 42 has a polygonal (e.g., rectangular) cross-section. The opposed portion 43 is provided at a lower side of the tightening portion 42. The opposed portion 43 has an outer peripheral surface with a circular cross-section.

Figure 4:
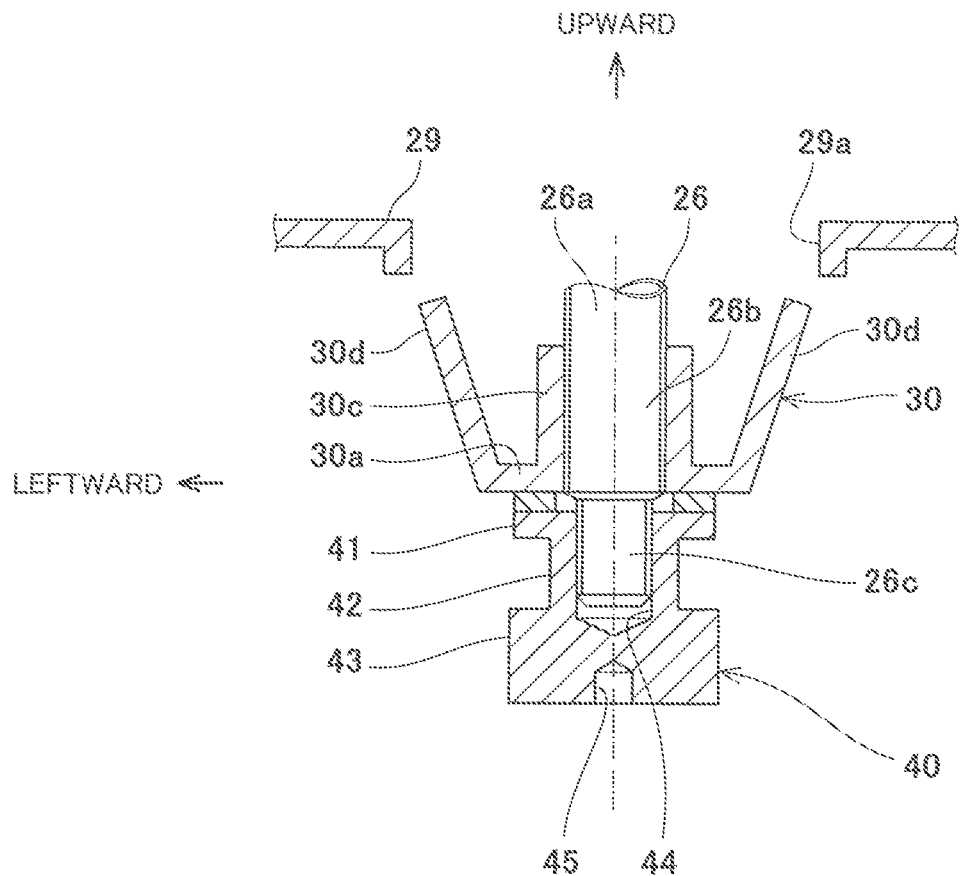
FIG. 4 is a cross-sectional view of an area surrounding a lower end portion of an output shaft, showing a step of mounting a protrusive member to the lower end portion of the output shaft.

With reference to FIG. 4, when the pitman arm 30 is fastened to the output shaft 26, the pair of limiters 30d are oriented in an upward direction, the tubular connecting portion 30c is spline-fitted to an outer peripheral side of the spline portion 26b, and the female thread 44 of the protrusive member 40 is threadingly engaged with the male thread 26c. In this case, the protrusive member 40 is tightened in such a manner that a tool such as a screw wrench is fitted to the outer surface of the tightening portion 42. In a state where the pitman arm 30 is fastened to the output shaft 26 with this tightening, one of the limiters 30d comes into contact with a stopper (not shown) provided at a front end portion of the support board 29 when the output shaft 26 rotates a predetermined rotational angle from a neutral position, thereby restricting a steering angle.

Turning back to FIG. 3, to allow the stopper 50 to be mounted to the differential device 17, the gear case 18 of the differential device 17 has a recess 18a depressed downward at an upper portion and an intermediate portion in the rightward and leftward direction. A pair of right and left bolt engagement holes 18b are disposed on an upper surface of the gear case 18 to sandwich the recess 18a in the rightward and leftward direction and open upward, and a pair of stopper support surfaces 18c are formed on the upper surface of the gear case 18 to surround the bolt engagement holes 18b, respectively.

The stopper 50 has a stopper base 51 and a peripheral wall 52. The stopper base 51 has a flat plate shape. The peripheral wall 52 has a cylindrical shape and is extended in an upward direction from a center portion of the stopper base 51 in the rightward and leftward direction. The peripheral wall 52 forms a cylindrical space 53 on its inner peripheral side. The cylindrical space 53 has a circular opening 53a at an upper end thereof. The stopper base 51 has a pair of bolt insertion holes 54 at right and left end portions. These bolt insertion holes 54 have larger diameters than the bolt engagement holes 18b.

Figure 5:
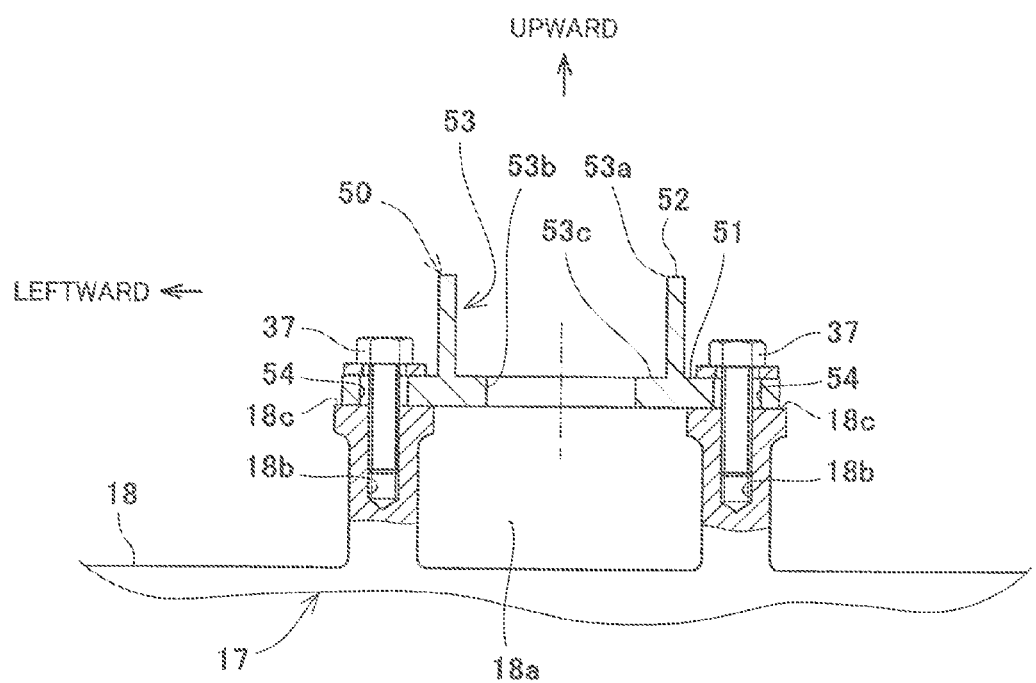
FIG. 5 is a cross-sectional view of an area surrounding an upper portion of a differential device, showing a step of mounting a stopper to the differential device.

With reference to FIG. 5, when the stopper 50 is mounted to the differential device 17, a lower surface of the stopper base 51 is placed on the stopper support surfaces 18c, the bolt insertion holes 54 are aligned with the bolt engagement holes 18b, respectively, and bolts 37 are inserted through the bolt insertion holes 54 and threadingly engaged with the bolt engagement holes 18b, respectively. At this time, the bolts 37 are fastened with slack. Since the bolt insertion holes 54 have larger diameters than the bolt engagement holes 18c (i.e., bolts 37), the stopper 50 is movable on the stopper support surfaces 18c in the forward and rearward direction and in the rightward and leftward direction.

The stopper 50 has a through-hole 53b which opens a lower end of the cylindrical space 53. Therefore, in a state where the stopper 50 is mounted to the differential device 17, the cylindrical space 53 communicates with the recess 18a via the through-hole 53b. The through-hole 53b has a diameter smaller than an inner diameter of the cylindrical space 53. Therefore, the cylindrical space 53 is also defined by a ring-shaped bottom surface 53c surrounding an outer peripheral side of the through-hole 53b and protruding radially inward from an inner peripheral surface of the peripheral wall 52.

Turning back to FIG. 3, after the differential device 17 to which the stopper 50 is mounted is supported on the vehicle body frame 2, the assembly unit described with reference to FIG. 4 is mounted to the vehicle body frame 2. The differential device 17 is positioned below the sub-gusset frames 14.

To allow the support board 29 to be mounted to the vehicle body frame 2, each sub-gusset frame 14 has a seat 14a which swells upward at a center portion in the forward and rearward direction. The seat 14a has female threads 14b which are spaced apart from each other in the forward and rearward direction. The support board 29 has female threads 29c formed in the forward and rearward direction at each of right and left sides of the support board 29. When the support board 29 is mounted to the vehicle body frame 2, the lower surface of the support board 29 is placed on the upper surfaces of the seats 14a, the female threads 29c are aligned with the female threads 14b, respectively, and bolts 38 are threaded into the female threads 29c and 14b.

FIG. 3 depicts where a center line C, centered in a vehicle width direction, passes through the support board 29 in a state where the support board 29 is mounted to the sub-gusset frames 14. As shown in FIG. 3, the center line C connects the apexes of the hexagonal support board 29 in the forward and rearward direction. The female threads 29b of the support board 29 are arranged at front side and at rear side and located rightward relative to the apexes. For this reason, the pair of fastening portions 22a of the EPS device 22 are provided at a front side and at a rear side and located rightward relative to the center line C. Thus, the EPS device 22 is disposed such that it is located rightward relative to a center in the vehicle width direction with its longitudinal direction oriented in the forward and rearward direction. Because of this, in the vicinity of a location where the sub-gusset frames 14 are disposed, a large space is ensured at the right side relative to the center line C in the vehicle width direction to arrange other constituents of the EPS device 22. This improves flexibility of layout of components at a front part of the utility vehicle 1. In this embodiment, as described later, a load transferred from the output shaft 26 to other components of the EPS device 22, such as the gear case 18, can be reduced. Therefore, it is possible to sufficiently inhibit stress from concentrating undesirably and excessively, even using the above eccentric arrangement.

Figure 6:
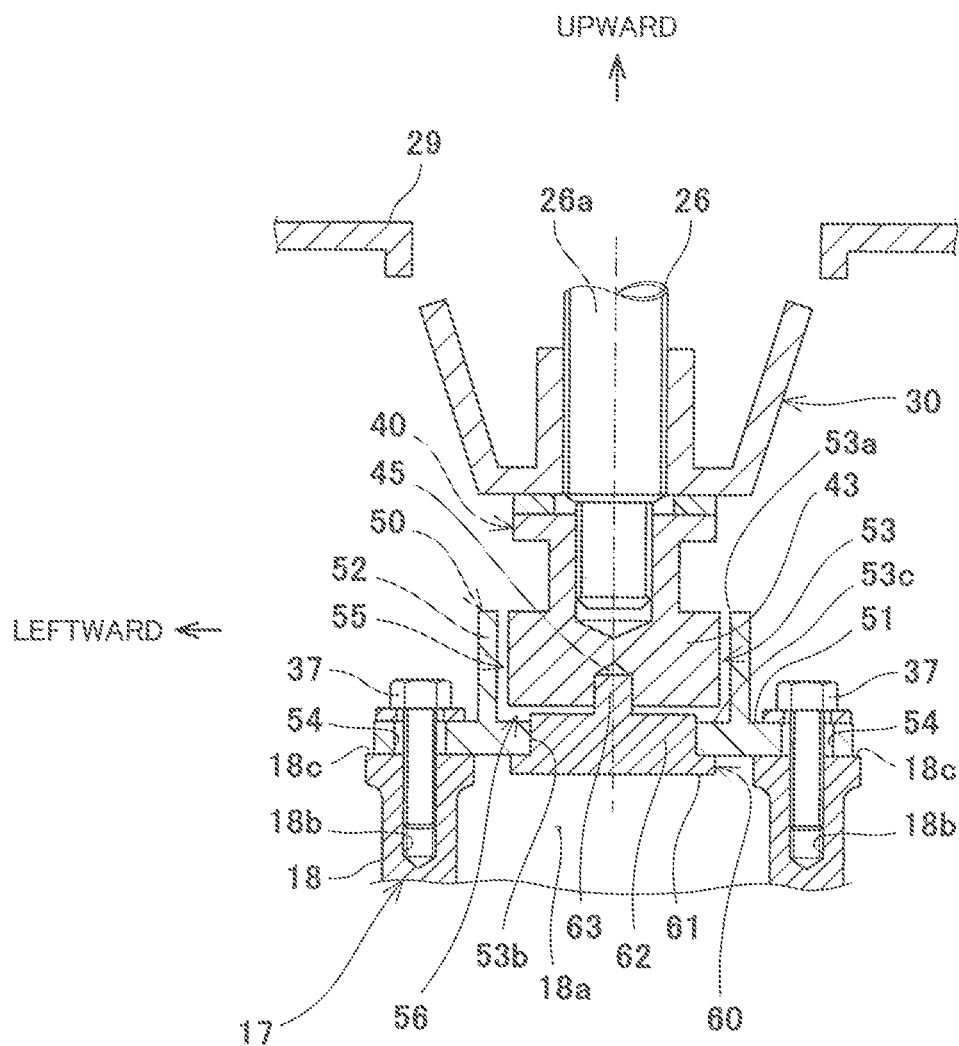
FIG. 6 is a cross-sectional view of an area surrounding the lower end portion of the output shaft, showing a step of disposing the protrusive member and the stopper member such that they face each other.

With reference to FIG. 6, to dispose the stopper 50 and the protrusive member 40 such that they face each other, a jig 60 is attached to the stopper 50 prior to fastening the support board 29 to the vehicle body frame 2 (see FIG. 2) in the manner described above. The jig 60 is a tool for positioning the protrusive member 40 with respect to the stopper 50. The jig 60 includes a flange portion 61, a cylindrical portion 62, and a pin portion 63. The cylindrical portion 62 has a slightly smaller outer diameter than the through-hole 53b. The flange portion 61 protrudes radially outward from an outer peripheral surface of the cylindrical portion 62. The pin portion 63 protrudes from a center portion of an axial end surface of the cylindrical portion 62. The jig 60 is attached to the stopper 50 in such a manner that a tip end of the pin portion 63 is disposed inside the cylindrical space 53 through the through-hole 53b, the cylindrical portion 62 is fitted to the through-hole 53b and the flange portion 61 contacts a lower surface of the stopper base 51. A means for attaching the jig 60 to the stopper 50 is not particularly limited. The opposed portion 43, forming a lower portion of the protrusive member 40, has a positioning hole 45, which opens at a center portion of a lower end surface thereof.

When the support board 29 is mounted to the vehicle body frame 2, the protrusive member 40 is accommodated into the cylindrical space 53 through the opening 53a at the upper end inside the cylindrical space 53. Then, the stopper 50 is moved on the stopper support surfaces 18c so that the pin portion 63 is accommodated into the positioning hole 45, the pin portion 63 is accommodated into the positioning hole 45, the support board 29 is fastened to the vehicle body frame 2 (see FIG. 2), then the bolts 37 are tightened, and thereafter the jig 60 is detached and is taken out from the recess 18a.

Since the protrusive member 40 is disposed inside the cylindrical space 53 and the stopper base 51 is positioned with respect to the differential device 17 using the above described jig 60, a center of the opposed portion 43 of the protrusive member 40 can be aligned with a center of the cylindrical space 53 correctly. Thus, a clearance 55 can be formed between an outer peripheral surface of the opposed portion 43 and an inner peripheral surface of the peripheral wall 52 defining the cylindrical space 53, such that the clearance 55 has a substantially uniform dimension (clearance) over the entire opposed portion 43 and the entire peripheral wall 52 in a circumferential direction.

Figure 7A:
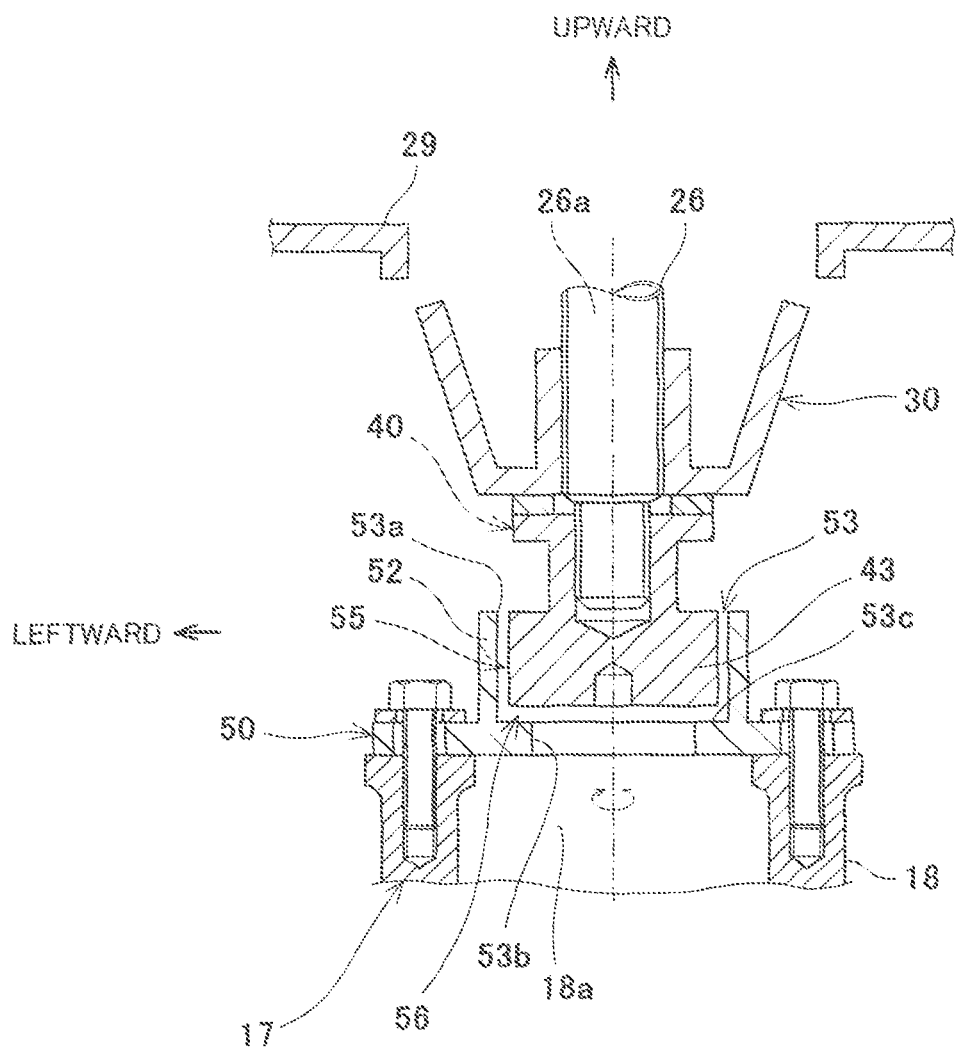
FIG. 7A is a cross-sectional view showing the protrusive member and the stopper in a state where no load is applied to front wheels.
Figure 7B:
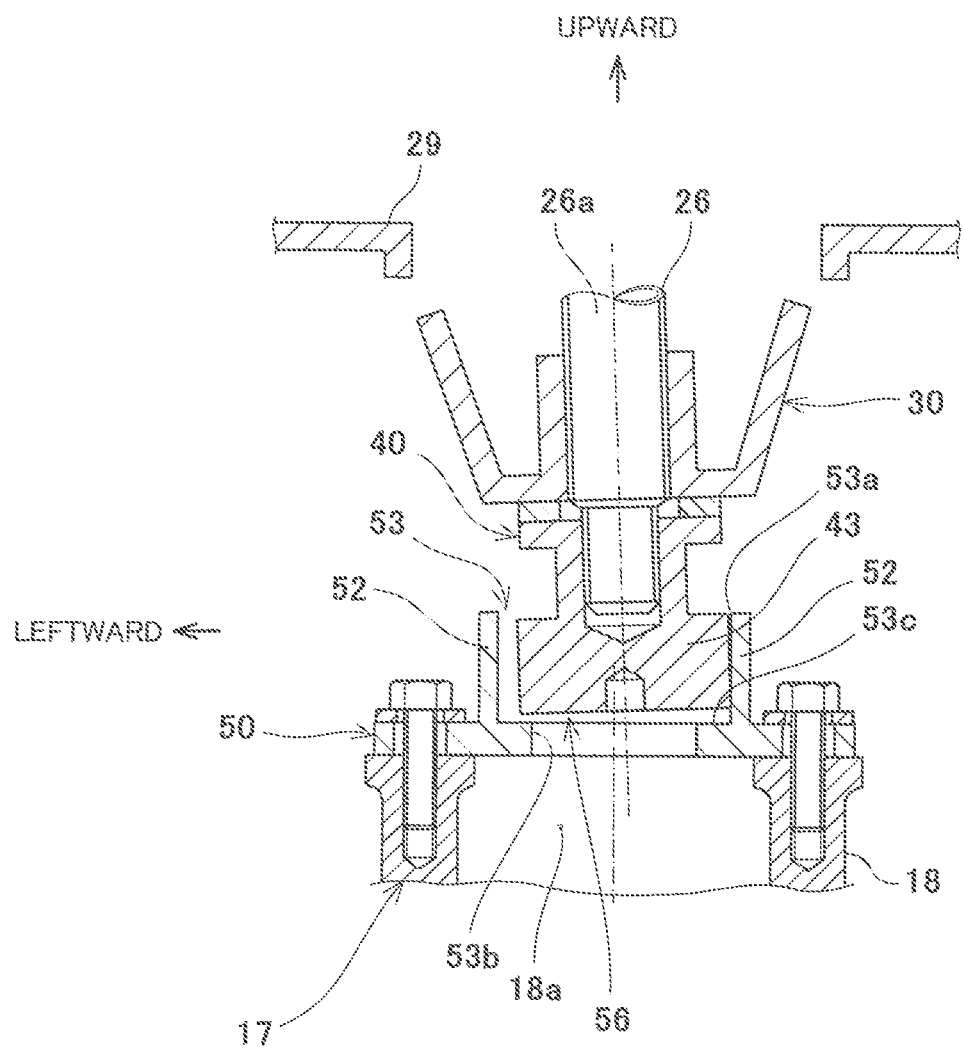
FIG. 7B is a cross-sectional view showing the protrusive member and the stopper in a state where a load is input to the output shaft.

FIG. 7A is a cross-sectional view showing an area surrounding the stopper 50 and the protrusive member 40 in a state where no load is applied to the front wheels 2 (FIG. 1), and FIG. 7B is a cross-sectional view showing an area surrounding the stopper 50 and the protrusive member 40 in a state where a load is input to the output shaft 26. As shown in FIG. 7A, a diameter of the cylindrical space 53 is 0.5 mm to 1.5 mm larger than an outer diameter of the opposed portion 43. Because of this, the clearance 55 of 0.5 mm to 1.5 mm is formed over an entire circumference between the peripheral wall 52 and the opposed portion 43. The lower end surface of the opposed portion 43 is disposed to face the bottom surface 53c defining the cylindrical space 53 with a clearance 56 therebetween. Therefore, when the driver steers the handle 6 (see FIG. 1), the rotation of the output shaft 26 is not impeded by the stopper 50. As a result, the front wheels 2 change their direction according to the driver's operation.

Referring to FIG. 7B, a load from the front wheel 2 (see FIG. 1) side is input to the lower end portion 26a of the output shaft 26 attached with the pitman arm 30 constituting the link unit 23 (see FIG. 3). Since the tie rods 31 (see FIG. 3) extend in the rightward and rearward direction as described with reference to FIG. 3, the load applied to the output shaft 26 via the pitman arm 30 contains a large component in the rightward and leftward direction. Therefore, when the load from the front wheel 2 side is applied to the output shaft 26, the lower end portion 26a of the output shaft 26 is tilted substantially to the right or to the left (FIG. 7B shows a case where the lower end portion 26a of the output shaft 26 is tilted to the right). Even when the lower end portion 26a of the output shaft 26 is tilted in this way, the load input to the output shaft 26 is partially supported by the stopper 50, because the outer peripheral surface of the opposed portion 43 can come into contact with the inner peripheral surface of the peripheral wall 52. Therefore, in the load input to the output shaft 26, a portion applied to another components of the EPS device 22 (see FIG. 3) such as the gear case 18, can be reduced. As a result, durability of the EPS device 22 improves. In this embodiment, the clearance 56 exists between the lower surface of the protrusive member 40 and the bottom surface 53c, defining the cylindrical space 53, and the clearance 56 allows the output shaft 26 to be tilted as described above. Since the stopper 50 is fastened to the gear case 18 of the differential device 17, the load supported by the stopper 50 can be received in the gear case 18. Therefore, durability of the stopper 50 improves. Since the clearance 55 has a small size of 0.5 mm to 1.5 mm, the opposed portion 43 can come into contact with the stopper 50 within a range in which the output shaft 26 is elastically deformed, thereby suitably preventing the output shaft 26 from being plastically deformed. When the output shaft 26 is free from the load, it returns to a state as shown by FIG. 7A, and the clearance 55 is formed again between the outer surface of the opposed portion 43 and the inner peripheral surface of the peripheral wall 52 over the entire circumference.

Referring to FIG. 7A, during driving off-road, foreign matters such as mud might enter the clearance 55 through the opening 53a. To address this, the clearance 56 is also formed between the lower end surface of the opposed portion 43 and the bottom surface 53c, and the cylindrical space 53 communicates with the recess 18a formed by the differential device 17 through the through-hole 53b. Therefore, if foreign matter enters the clearance 55, it can be discharged into the recess 18a through the clearance 53b and the through-hole 53b. In this manner, the through-hole 53b and the recess 18a serve to place and position the jig 60 (see FIG. 6) and discharge the foreign matter therethrough.

The lower end surface of the opposed portion 43 faces the bottom surface 53c with the clearance 56 therebetween. Therefore, even if the male thread 26c and the female thread 44 get slack, and thereby the protrusive member 40 is displaced downward along an axial direction of the output shaft 26, a slack corresponding to an initial size of the clearance 56 can be permitted. An outer diameter of the opposed portion 43 is larger than a diameter of the through-hole 53b. Thus, since the opposed portion 43 of the protrusive member 40 is sized to be insertable into the through-hole 53b, it is possible to prevent the protrusive member 40 from falling through the through-hole 53b. The cylindrical opposed portion 43 of the protrusive member 40 is accommodated into the cylindrical space 53, and at least a majority of the tightening portion 42 is exposed outside and above the cylindrical space 53. Therefore, after the above described assembly unit is mounted to the vehicle body frame 2, the tool can be easily fitted to the outer surface of the tightening portion 42, and the protrusive member 40 and the pitman arm 30 can be maintained easily.

As should be appreciated from the above, the stopper 50 has the stopper base 51 of the flat plate shape to allow the peripheral wall 52 facing the lower end portion 26a to be extended in an upward direction, and the peripheral wall 52 can be placed and positioned by fastening the stopper base 51 to the differential device 17. Thus, it is not necessary to change a design of the differential device 17 so that, for example, the wall facing the lower end portion 26a is formed integrally with the gear case 18. By using the existing differential device 17, the portion facing the lower end portion 26a can be applied to the all terrain vehicle 1. As a matter of course, in a structure in which the wall is formed integrally with the gear case 18, the load input to the output shaft 26 can be partially supported.

The opposed portion 43 facing the stopper 50 is provided at the protrusive member 40, which is separate from a shaft body of the outputs shaft 26. Therefore, the stopper 50 and the shaft body can be maintained easily. Since the tightening portion 42 for fastening the pitman arm 30 and the opposed portion 43 facing the stopper 50 are provided at an identical component, the number of components and the number of assembling steps can be reduced. As a matter of course, even in a case where the shaft body of the output shaft 26 faces the stopper 50, and in a case where a component having the opposed portion 43 and a component having the tightening portion 42 are separate components, an advantage that the load input to the output shaft 26 can be partially supported is achieved.

The peripheral wall 52 has an endless shape in a circumferential direction, and an outer peripheral surface of the opposed portion 43 faces an inner peripheral surface of the peripheral wall 52 over an entire circumference. Therefore, the stopper 50 can receive the output shaft 26 tilted to the front or to the rear, or to the right or to the left. As described above, the load input from the front wheel 2 side to the output shaft 26 via the link unit 23 contains a large component in the rightward and leftward direction. Therefore, by disposing the stopper with the clearance 55 between the stopper and at least a left portion and a right portion of the lower end portion of the output shaft 26 as shown in FIGS. 8 and 9, an advantage that the load input to the output shaft 26 can be sufficiently supported is achieved effectively.

Figure 8:
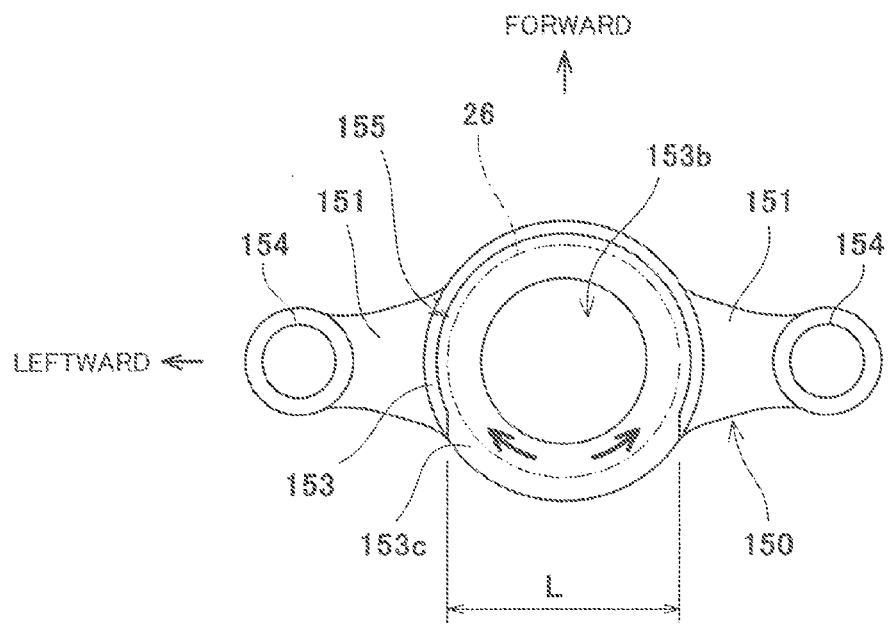
FIG. 8 is a plan view showing a stopper according to modification example 1 of the embodiment of the present invention.
Figure 9:
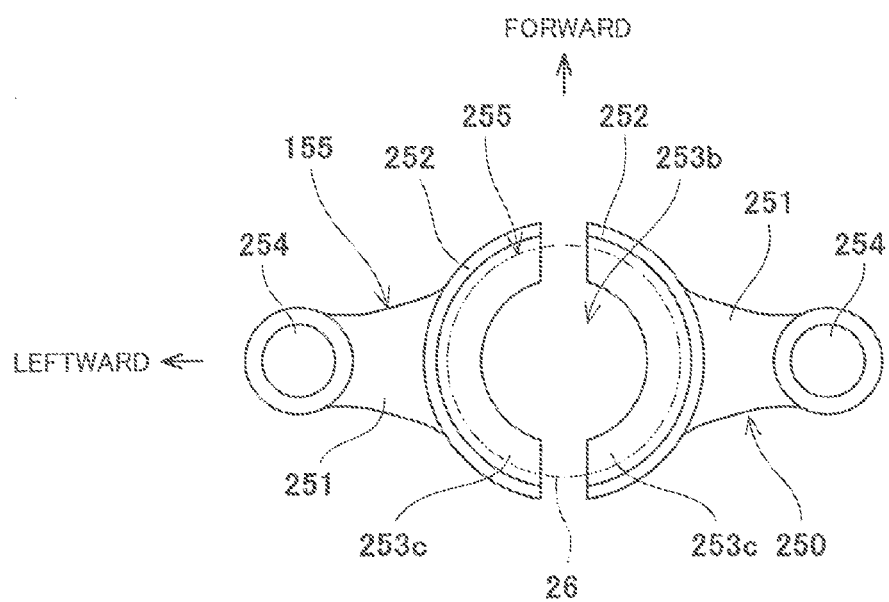
FIG. 9 is a plan view showing a stopper according to modification example 2 of the embodiment of the present invention.

FIG. 8 is a plan view showing a stopper 150 according to modification example 1 of the embodiment of the present invention. As shown in FIG. 8, the stopper 150 includes a stopper base 151 and a pair of bolt insertion holes 154 which are similar to those of the embodiment. An opposed wall 153 is extended in an upward direction from a center portion of an upper surface of the stopper base 151 in the rightward and leftward direction. The opposed wall 153 has a C-shape when viewed from above. The opposed wall 153 faces the output shaft 26 with a clearance 155 between the opposed wall 153, and a left portion, a front portion and a right portion of the output shaft 26. On the other hand, a rear portion of the output shaft 26 does not face the opposed wall 153 and does not overlap with the opposed wall 153 when viewed from behind. A distance L between a left rear end portion of the opposed wall 153 and a right rear end portion of the opposed wall 153 is slightly greater than a diameter of the output shaft 26. Therefore, even in a state where the above assembly unit is mounted to the vehicle body frame, the stopper 150 can be easily detached. By pulling out the bolt inserted into the bolt insertion hole 154 and pulling out the stopper 150 in a forward direction so that the output shaft 26 passes through a space between the left rear end portion of the opposed wall 153 and the right rear end portion of the opposed wall 153, only the stopper 150 can be detached in a state where the assembly is mounted to the vehicle body frame 2 (see FIG. 2).

The load input to the output shaft 26 contains a large component in the rightward and leftward direction as described above and a forward component according to a direction in which the pitman arm is pivoted as indicated by a circular-arc arrow in FIG. 8. In contrast, the opposed wall 153 of the C-shape in a plan view according to modification example 1 is disposed to face the output shaft 26 with the clearance 155 between the opposed wall 153 and a front portion of the output shaft 26. Therefore, even when the output shaft 26 is tilted to the front, the opposed wall 153 contacts the tilted output shaft 26 and suitably supports the load input to the output shaft 26.

Like the above embodiment, the stopper 150 of modified example 1 has a through-hole 153b and a bottom surface 153c. Thus, like the above embodiment, it is possible to achieve the advantages that foreign matter can be discharged, the jig can be placed and positioned, and the protrusive member is prevented from falling from the output shaft 26 attached with the protrusive member.

FIG. 9 is a plan view showing stoppers 250 according to modified example 2 of the embodiment of the present invention. The stoppers 250 of modified example 2 are a pair of right and left stoppers. Each stopper 250 includes a stopper base 251, a bolt insertion hole 254 provided at one end portion of the stopper base 252 in the rightward and leftward direction and an opposed wall 252 uprising from an opposite end portion of the stopper base 251 in the rightward and leftward direction. The opposed wall 252 has a circular-arc shape when viewed from above. The left stopper 250 is placed such that the bolt insertion hole 254 is positioned at a left side and the opposed wall 252 is positioned at a right side. The right stopper 252 is placed such that the bolt insertion hole 254 is positioned at a right side and the opposed wall 252 is positioned at a left side. In this way, the pair of opposed walls 252 are disposed to face each other. A lower end portion of the output shaft 26 is disposed in a space defined by inner surfaces of the pair of opposed walls 252. The left opposed wall 252 faces the output shaft 26 with a clearance 255 between the left opposed wall 252 and a left portion of the output shaft 26, while the right opposed wall 252 faces the output shaft 26 with the clearance 255 between the right opposed wall 252 and a right portion of the output shaft 26.

In modified example 2, like modified example 1, the stopper 250 can be easily detached in a state where the assembly unit is mounted to the vehicle body frame. Since the pair of stoppers 250 sandwich the output shaft 26 between them, in modified example 2, the stopper 250 can be easily detached although a distance between the pair of opposed walls 252 is less than a diameter of the output shaft 26. In modified example 2, like the above embodiment and modified example 1, a through-hole 253b and a bottom surface 253c can be formed in a portion defined by inner surfaces of the pair of opposed walls 252. Thus, it is possible to achieve advantages that foreign matter can be discharged, the jig can be placed and positioned, and the protrusive member is prevented from falling from the output shaft 26 attached with the protrusive member.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An all terrain vehicle comprising:
a steering shaft coupled to a handle;
a power steering device including an input shaft coupled to the steering shaft, and an output shaft driven to rotate together with the input shaft, the power steering device being positioned between right and left front wheels in a rightward and leftward direction;
a link unit for coupling the output shaft to each of the right and left front wheels, the link unit receiving a rotation of the output shaft and changing a direction of the front wheels;

a stopper disposed to face the output shaft with a clearance between the stopper and at least a left portion and a right portion of an end portion of the output shaft; and a differential device disposed between the right and left front wheels;

wherein the stopper has a peripheral wall defining a cylindrical space having an opening at at least one end thereof;

wherein the output shaft is disposed such that a tip end portion thereof is accommodated into the cylindrical space through the opening and the clearance is formed between an inner surface of the peripheral wall and the tip end portion; and wherein the stopper has a base wall fastened to an upper surface of the differential device, and the peripheral wall is extended in an upward direction from the base wall such that the opening is oriented substantially upward.

2. The all terrain vehicle according to claim 1, wherein the stopper has a through-hole which opens an opposite end of the cylindrical space which is at an opposite side of the one end of the cylindrical space;

the differential device has at its upper portion, a recess, and the cylindrical space communicates with the recess through the through-hole in a state where the base wall is fastened to the differential device.

3. The all terrain vehicle according to claim 2, further comprising:

a protrusive member attached to the tip end portion of the output shaft;

wherein the protrusive member is sized to be insertable into the through-hole and disposed inside the cylindrical space such that there is a clearance in a vertical direction between the through-hole and the protrusive member.

4. The all terrain vehicle according to claim 1, wherein the differential device has a plurality of engagement holes into which engagement members for fastening the base wall are engageable, and the base wall has a plurality of insertion holes into which the engagement members are inserted, respectively; and at least one of the plurality of insertion holes has a circular shape having a larger diameter than a corresponding one of the engagement holes.

5. The all terrain vehicle according to claim 1, wherein the clearance is in a range between 0.5 mm and 1.5 mm in a state where no load is applied to the front wheels.

6. An all terrain vehicle comprising:

a steering shaft coupled to a handle;

a power steering device including an input shaft coupled to the steering shaft, and an output shaft driven to rotate together with the input shaft, the power steering device being positioned between right and left front wheels in a rightward and leftward direction;

a link unit for coupling the output shaft to each of the right and left front wheels, the link unit receiving a rotation of the output shaft and changing a direction of the front wheels;

a stopper disposed to face the output shaft with a clearance between the stopper and at least a left portion and a right portion of an end portion of the output shaft; and a protrusive member attached to the tip end portion of the output shaft;

wherein the protrusive member is disposed such that there is a clearance between the stopper and the protrusive member;

wherein the link unit includes a pitman arm fastened to the output shaft, the pitman arm receiving a rotation of the output shaft and thereby being pivoted;

wherein the protrusive member includes an opposed portion disposed with the clearance between the opposed portion and the stopper, and a tightening portion disposed at an upside of the opposed portion to tighten the pitman arm; and wherein an outer surface of the tightening portion is exposed outside the opposed portion.

7. An all terrain vehicle comprising:

a steering shaft coupled to a handle;

a power steering device including an input shaft coupled to the steering shaft, and an output shaft driven to rotate together with the input shaft, the power steering device being positioned between right and left front wheels in a rightward and leftward direction;

a link unit for coupling the output shaft to each of the right and left front wheels, the link unit receiving a rotation of the output shaft and changing a direction of the front wheels;

a stopper disposed to face the output shaft with a clearance between the stopper and at least a left portion and a right portion of an end portion of the output shaft; and a support board supported on a vehicle body frame and disposed between the right and left front wheels;

wherein the power steering device further includes a gear case supported on the support board and a pair of fastening portions for fastening the gear case to the support board; and wherein the pair of fastening portions protrude forward and rearward, respectively, when viewed from the gear case.

8. The all terrain vehicle according to claim 7, wherein the pair of fastening portions are positioned leftward or rightward relative to a center in a vehicle width direction.

* * * * *